Aug. 30, 1966    J. A. DOWNIE ET AL    3,270,110
METHOD OF MAKING A DETERGENT PRESS DIE MEMBER
Original Filed Aug. 7, 1959
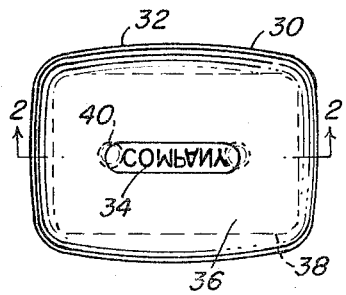
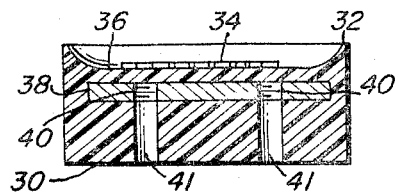
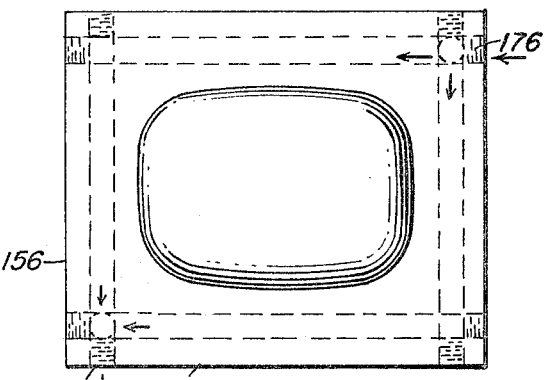
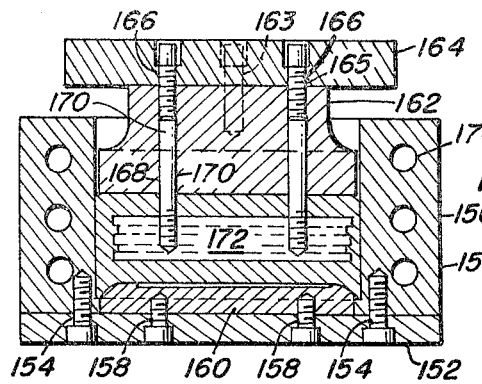
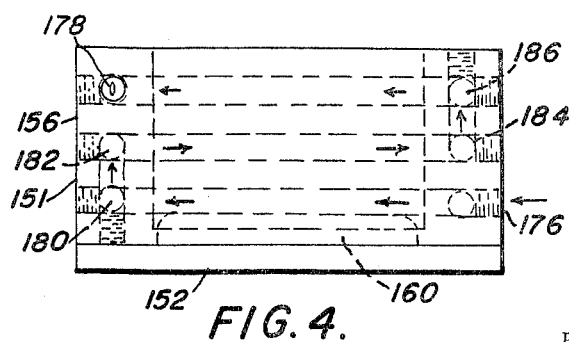
INVENTORS
JOHN ARTHUR DOWNIE
WILLIAM BOYD
BY George H. Mortimer
ATTORNEY United States Patent Office 3,270,110
Patented August 30, 1966

3,270,110
METHOD OF MAKING A DETERGENT
PRESS DIE MEMBER
John Arthur Downie, Scarborough, Ontario, and William Boyd, Toronto, Ontario, Canada, assignors to Colgate-Palmolive Company, New York, N.Y., a corporation of Delaware
Original application Aug. 7, 1959, Ser. No. 832,279. Divided and this application Apr. 22, 1963, Ser. No. 285,165
3 Claims. (Cl. 264—219)

This application is a division of application Serial No. 832,279, filed August 7, 1959, now U.S. 3,094,758.

The present invention relates to a method of making a detergent press die member for pressing detergents into bars or cakes.

In accordance with the present invention there is provided a method of making a precision molded detergent press die member of soft, flexible, resilient, polymeric synthetic organic plastic material, which plastic material is normally subject to shrinkage during molding, which comprises filling with such a plastic material a walled, bottomed mold cavity having substantially parallel vertical walls and a bottom portion with an upper surface shaped and figured like the desired face of a detergent bar to be pressed by the die; maintaining the temperature of the plastic at a temperature above its melting point to keep it fluid; applying pressure to the plastic material in a liquid state to force it against the bottom and sides of said mold by lowering into said mold a piston member having removably attached thereto by attaching means a rigid member having a transverse cross-sectional area which is a substantial part of the corresponding mold cavity cross-sectional area, said attaching means being operably and removably connected to said rigid member and said piston; positioning said rigid member in said liquid plastic material substantially parallel to the bottom of said mold by said piston; cooling said plastic material while maintaining said pressure until said plastic material is solidified and lowered to a temperature below that at which it will shrink appreciably; releasing said die member having said rigid member embedded therein from said piston and said attaching means and removing said die member having a rigid member embedded therein from said mold.

The method of making the precision molded die member and the structure, function and advantages of the die member made in accordance with this process will be apparent from reference to the following detailed description taken in conjunction with the accompanying drawings in which:

FIG. 1 is a side elevation of a lettered soft plastic die containing a rigid plate member parallel to the die working surface made by the described method;

FIG. 2 is a horizontal section of the die of FIG. 1;

FIG. 3 is a plan view of a mold for making the plastic dies showing the path of heating fluid or coolant;

FIG. 4 is an elevation of the mold of FIG. 3;

FIG. 5 is a vertical sectional view of the mold including pressing apparatus for molding the soft plastic detergent pressing die.

In FIGURES 1 and 2, numeral 30 designates a soft plastic die member having a raised thin edge 32 which is sufficiently flexible and resilient to expand outwardly when subjected to pressing forces. Die 30 has inverted lettering 34 appearing on the face for stamping detergent cakes to be pressed with brand identification or other descriptive material. Similarly, patterns and designs may be molded or impressed into the die face so that the detergent cake may be attractively decorated. In the interior of soap die 30 near to the die working surface 36 is embedded a rigid member 38 which is of sufficient size and near enough to working surface 36 containing design, figures or lettering 34 to decrease or inhibit distortion of said figures during detergent pressing operations. This element facilitates the fastening of the die to the pressing means, allowing a bolted attachment which would not be possible with all soft plastics because the plastic threads or other holding device would yield or fail. The rigid member is preferably of metal, such as steel or brass, but other materials of sufficient firmness may also be employed. As illustrated the rigid member is of relatively flat plate shape. To promote firm fastening to or embedding in the die the surface of the plate may be scored, perforated or grooved. The distance between working surface 36 and member 38 will be variable to some extent, depending on the plastic employed, but will usually be between 1/16 and 3/4 of an inch. This dimension should be enough to allow the plastic near the edge of the rigid member to be resilient enough to absorb the shocks of pressing without failing before a sufficient number of cakes has been pressed. In FIGS. 1 and 2 rigid member 34 is shown having a pair of tapped holes 40 into which fastening bolts or studs may be screwed through bores 41 to attach the die to a pressing member.

In FIGS. 3–5 a mold 151 for the manufacture of the detergent pressing dies is shown in detail. The mold body is constructed of a bottom 152 joined by machine screws 154 to substantially parallel vertical walls 156. To the bottom or base plate there is fastened by machine screws 158 within the enclosure of base plate and walls another bottom 160 shaped and figured like the desired face of a detergent bar to be pressed by a molded die. A piston 162 is capable of applying a high pressure to plastic within the mold. The piston is attached to pressing means by any suitable connection, such as studs 163 and plate 164. In the illustration given, between said pressing means, not shown, and the piston rigid plate member 164 is drilled and tapped for studs 166, the purpose of which will be explained. The tap holes 165 in plate 164 register with drill holes 168 through piston 162 in which are frictionally fitted rods 170 threaded at the lower ends into rigid member 172. By rotation of studs 166 rigid member 172 may be lowered into the mold so as to be as near the bottom 160 as is necessary or desirable to limit distortion of the molded die working face member, either while cooling after molding or during pressing of detergent, and to provide a satisfactory means of fastening the die to the pressing apparatus.

The sides of the mold contain inter-connected channels 174 for the passage of heating or cooling fluid to melt or solidify the soft plastic. As will be seen from a study of FIGS. 3 and 4 the heat transfer fluid enters the mold at 176 and exits at 178, pursuing a path as indicated by the arrows (the arrows in FIG. 3 showing flow at the lowermost of the three levels). The channels for passage of heat transfer fluid are made by boring holes parallel to each side of the mold at three levels and by connecting these levels by means of holes drilled from 180 to 182 and from 184 to 186. All drilled and bored holes communicating with the exterior of the mold are plugged, as shown by shaded portions, except at the inlet and outlet. It is seen that the liquid heat transfer medium enters the mold at the inlet hole at the right rear corner of the bottom level. It divides into two streams flowing toward the diagonally opposite corner of the mold where it flows upward toward point 182, whence it pursues two paths on the middle level toward point 184, from which it rises to the top level, divides and exits from outlet 178. By following a tortuous path such as that described the heat transfer medium rapidly and evenly alters the temperature of the mold. It will be evident that other methods of heating and cooling the mold and the plastic therein may also be found adequate in the present molding process.

In operation the molding of the present detergent pressing dies is trouble free and economical. In a typical process the beads of plastic resin, generally a thermoplastic because of the ease of melting and solidification of these materials, are heated until they become liquid after which the plastic is poured into the mold. Alternatively, the particles of resin may be placed in the mold and then heated until fluid. The piston having attached force-transmitting members 170 and rigid member 172 is lowered into the mold and a compressive force is applied to it by the pressing means. In this compression molding operation the piston or plunger should be able to withstand high pressures on the order of 500–2,500 pounds per square inch. In the molding of polyethylene it has been found that a pressure of approximately 1,400 pounds per square inch is best for manufacture of an undistorted die. After the piston has applied its full pressure to the molten plastic and has traveled downwardly as far as it can go studs 166 may be turned to lower the tightly fitted rods 170 and thereby move the rigid member 172 to the predetermined correct distance above the mold bottom. As illustrated in FIG. 5 no means has been provided for adjusting upward the height of rigid member 172 because this is not usually necessary. However, it is evident that, should such adjustment be considered advantageous, studs 166 and rods 170 can be so connected as to allow vertical movement of the rigid member 172 in either direction while molding.

After the piston and rigid member have been positioned correctly coolant is allowed to flow through the mold walls. Generally the mold and piston are constructed of heat conductive material to promote rapid solidification of the plastic. During the entire cooling cycle it is best to maintain pressure on the plastic. This, in conjunction with the presence of the rigid internal member helps to maintain the dimensional stability of the molded article. It has been found that the molded die will often be widest near the rigid internal member, due to less shrinkage at that position. Thus, the dimensions of the die are controllable to an extent by relocation of the rigid member in the soft plastic. After the molded die has been cooled to a point below which shrinkage distortion is negligible, usually to near room temperature, the base plate is removed and the molded die with piston 162, and rod 170 attached and bottom 160 adhering is removed from the mold. The base plate may be taken off after removal of machine screws 154 and 158. The piston may be released by tightening studs 166. Should bottom 160 remain held to a plastic die after it has been taken out of the mold release may often be effected by striking the bottom a sharp blow with a rubber hammer in a direction parallel to its major surface.

The molded soft plastic die may be put into operation with threaded rods 170 still held fast or, if desired, these may be removed and other force-transmitting members can be attached to the die. In a particular preferred molding operation the pressing means 164 and the piston 162 are bored so that threaded rods or screws 76, as held in the finished die, will be registered with holding means in the detergent pressing apparatus. Thus, the molded die will be automatically positioned in the pressing apparatus die box with the proper clearance on all sides. It will often require no machining or fitting to the detergent press and may be put in operation without any further processing except for the removal of mold marks, if necessary.

In the preceding paragraphs a method of compression molding of soft plastic soap dies has been described. Although compression molded dies, as a rule, are of greater dimensional stability it is also possible to make properly designed soap dies by injection molding. In such cases the rigid member can be attached to the soft plastic during the molding operation, and sometimes may be joined to a separately molded plastic portion after molding, preferably by cementing, but bolting may also be employed.

Although dies made of harder plastics, of structure like that described in this specification, may be used in pressing soaps and detergents, there is a real advantage in the use of dies of the softer materials, because they are even more suitable for pressing detergents. The softer the plastic the more easily the raised thin edge of the die will be expandable to the die wall. Often the softer material will show less wear in operation than will harder plastics. With the use of the softer plastics greater clearances between die and die box may be obtained because the die edge is capable of greater expansion. Increased clearances allow easy expulsion of air as the die closes on the detergent blank, obviating the cushioning effect of entrapped air and decreasing the pressing time needed to obtain a perfectly pressed cake. They also help prevent contact of the die edge with the die box, when entering, even if they are not perfectly aligned.

Among the plastics that may be employed the most preferred are the polymers of lower alkylenes, e.g., polyethylene, polypropylene, mixed polymers of ethylene and propylene. It has been found that these lower alkylene polymers possess exceptionally good release characteristics, i.e., soaps and synthetic detergents are non-adhering to these plastics. Among the polyalkylenes those soft plastics know as polythene or polyethylene are preferred. As examples of suitable polythene resins from which the dies may be made may be mentioned types 204–E–07, 220G and 1200H produced by Canadian Industries Ltd.; such suitable materials have tensile strengths at yield of about 1,500 pounds per square inch, melt indexes between about 0.2 and 50 grams/10 min. and densities at 25° C. between about 0.915 and 0.920 gram/ml. These plastics, the polyethylenes, are generally described by their density and melt indexes. As the density increases the stiffness increases and the flex life decreases. With the same molecular weight distribution (weight average molecular weight/number average molecular weight) and constant density a higher melt index indicates a decreased tensile strength. If only molecular weight distribution is increased tensile strength also increases. Although the characteristics of density, melt index and molecular weight distribution are usually intended to aid the molder of plastics they are also of assistance in enabling one utilizing these materials to determine which plastics are most likely to be acceptable for his particular purpose. In experimentation done with various polyethylenes it has been found that soaps can be pressed successfully with polyethylene dies made from Canadian Industries Ltd., 220G, 204–E–07 and 1200H resins but dies of O1500A resin were not considered to be satisfactory. It is possible that O1500A resin may be used in some applications with rigid member closer to the die working surface or extending farther toward the raised thin edge, thereby better controlling distortion. Of the resins which gave good results type 220G, which has a melt index of 2.0 and a density of 0.919 was best. Included within the types of polyethylene that may be used for soap pressing dies is the more recently developed material of higher density, resins of density of 0.94 and higher being acceptable. The "Alathons" of E. I. du Pont de Nemours & Co. Inc. are also useful polyethylene resins from which soft plastic dies can be made. These products cover a comparatively wide range of polyethylenes those from Alathon 3 to Alathon 37 having melt indexes between 0.25 and 20, densities from 0.914 to 0.930 and molecular weight distributions from very narrow, less than 5, to 40. Weight average molecular weights within the range of 25,000–1,000,000 are most common.

Although soft polyethylenes and polyalkylene plastics are the preferred materials of the present soap pressing dies it is also possible to employ other soft plastics, such as polyvinyl chloride, polyvinyl-vinylidene chlorides, polymers obtained by interaction of bi-functional alkyl or aryl silanes with each other and with glycols and diamines, e.g., polyphenolsiloxane (silicones), polytetrafluoroalkylene, as well as thiokol-modified and polyamide-modified epoxies. Harder plastics, such as polystyrene, polycarbonates, cellulose acetate, polymethylmethacrylate (lucite), dimethylolmelamine, condensation products of dimethylol phenol with excess formaldehyde, copolymer amides of adipic acid with sebacic acid and hexamethylenediamine, halogenated or chlorinated polyethers, and many others may also be useful, providing that the polymer chains are of insufficient length to actually make these into hard plastics or the plastics are so modified with plasticizers or by other means so as to result in soft products. Limitations on the type of soft plastic that may be employed are those which will be evident to one skilled in the detergent art. In the die structure employed it must be of sufficient strength to press out the detergent and yet should be soft enough to expand readily to fill the die box. It must not react chemically with the material being pressed, nor with lubricating solutions that are employed in the pressing of detergents. The plastic must be resistant to distortion due to repeated impact, must not fatigue, and should not be too readily abraded by sliding contact of other surfaces. The term "soft plastics" should be interpreted to include those materials which are polymers of fairly high molecular weight, characterized by having a modulus of elasticity less than $5 \times 10^4$ pounds per square inch, a compressive strength below 10,000 pounds per square inch and a flexural strength under 8,000 pounds per square inch. Usually such soft plastics will have a modulus of elasticity below $3.5 \times 10^4$ pounds per square inch, a compressive strength below 8,000 pounds per square inch and a flexural strength below 7,000 pounds per square inch. Where the standard tests are not applicable because the plastic is too soft these characteristics are considered as less than the limits given. In some instances either one or two of these characteristics may be numerically above the ranges given but the other modulus will be low enough to compensate for these and the product will still be considered as soft. Thus, if one of the above properties is below the limits given, the product may often be considered as within the scope of the materials suitable for use as the present plastic dies.

In operation in a detergent pressing apparatus the soft plastic dies made according to the inventive method may be used in much the same manner as that in which the prior art metallic and rigid dies were employed. Being molded to shape and of flexible edge structure, machining and fitting of the dies will usually be unnecessary and they may be readily affixed to the detergent press in pre-registered relationship with the die box if that is desired. After affixation of the die to the pressing means a check run will speedily show whether the particular soft plastic can completely press out the detergent blank. If the lettering and designs on the detergent cake are not sharply defined it may be desirable to use a slightly harder, less yielding material for the die. Alternatively, it is often possible to cast another die, relocating the rigid member in the die to make the die firmer. It will often be found that utilizing a plodder nozzle or trimmer of shape more like that of the finished cake will facilitate pressing the detergent, as will increasing the moisture content of the soap or synthetic detergent to soften it.

Because polyethylene is non-adherent to soaps and synthetic detergent materials, a reduced amount of pressing solution should be employed, if such lubricant is used at all. The pressed bars will normally be discharged from the die box with a surface sheen or gloss much higher than that obtained when metal dies are used. The soap or detergent will not tend to adhere to the dies and consequently the machine need not be stopped as often for cleaning to avoid die marks. In some instances these dies have been run as long as an hour or two processing soap at the rate of about 120 cakes per minute without shutdown for cleaning.

The soft plastic dies produced according to the inventive method are long-lived when treated carefully. In test runs the described dies have been employed as long as five weeks, producing soap at the rate of 120 cakes per minute over a full eight-hour period, five days a week. At the end of that time the dies finally showed some signs of wear and were discarded, to be replaced by a new set. The inexpensiveness of the present soft plastic dies dictates their periodic replacement to assure that the detergent made has the best impression. It is more economical to replace these plastic dies than to refinish metal dies that have become worn.

In this specification at times the words upper, lower, top and bottom were used in describing the apparatus employed. It should be understood that these terms are not to be construed strictly because they were employed to simplify the description and to show the relative positions of various parts.

What is claimed is:

1. A method of making a precision molded detergent press die member of soft, flexible, resilient, polymeric synthetic organic plastic material, which plastic material is normally subject to shrinkage during molding, which comprises filling with such a plastic material in liquid form a mold cavity having substantially parallel vertical walls and a removably affixed bottom which is substantially lower at the sides of the mold than in the interior, the bottom being figured and shaped to mold a figured or reverse lettered die face with a raised thin edge; maintaining said plastic material in a liquid state; applying pressure to the plastic material, to force it against the bottom and sides of the mold, by lowering into the mold a piston member having removably attached thereto by attaching means a rigid member of transverse cross-sectional area which is a substantial part of the corresponding mold cavity cross-sectional area; positioning the rigid member in the molten plastic material substantially parallel to the bottom of the mold by means of adjusting means and the piston, said adjusting means contacting the attaching means removably attached to the rigid member to permit adjustment of the rigid member in a downward direction, said attaching means corresponding to the attaching and holding means of the pressing member to be affixed to the die during detergent pressing; cooling the plastic material while holding it under pressure until it is solidified and lowered to a temperature below that at which it will shrink appreciably, the rigid member thereby becoming embedded in the plastic die sufficiently near the detergent pressing surface thereof to significantly assist in maintaining the shaped and figured die working surface undistorted by shrinking during the cooling operation and undistorted during high speed pressing of detergent by the die; removing the mold bottom from the mold; releasing the die member having the rigid member embedded therein from the piston and ejecting the die member with attaching means attached from the mold.

2. A method of making a precision molded detergent press die member of soft, flexible, resilient, polymeric synthetic organic plastic material, which plastic material is normally subject to shrinkage during molding, which comprises filling with such a plastic material in solid form a mold cavity having substantially parallel vertical walls and a removably affixed bottom which is substantially lower at the sides of the mold than in the interior, the bottom being figured and shaped to mold a figured or reverse lettered die face with a raised thin edge; applying heat to the mold to melt the solid plastic material and to maintain the temperature of the plastic material above its melting point to keep it fluid; applying pressure to the plastic material, to force it against the bottom and sides of the mold, by lowering into the mold a piston member having removably attached thereto a rigid member of transverse cross-sectional area which is a substantial part of the corresponding mold cavity cross-sectional area; positioning the rigid member in the molten plastic material substantially parallel to the bottom of the mold by means of adjusting means and the piston, said adjusting means contacting the attaching means removably attached to the rigid member to permit adjustment of the rigid member in a downward direction, said attaching means corresponding to the attaching and holding means of the pressing member to be affixed to the die during detergent pressing; cooling the plastic material while holding it under pressure until it is solidified and lowered to a temperature below that at which it will shrink appreciably, the rigid member thereby becoming embedded in the plastic die sufficiently near the detergent pressing surface thereof to significantly assist in maintaining the shaped and figured die working surface undistorted by shrinking during the cooling operation and undistorted during high speed pressing of detergent by the die; removing the mold bottom from the mold; releasing the die member with the rigid member embedded therein from the piston and ejecting the die member with attaching means attached from the mold.

3. A method of making a precision molded detergent die member of soft, flexible, resilient, polymeric synthetic organic plastic material, which plastic material is normally subject to shrinkage during molding, which comprises filling a walled, bottomed mold cavity with said plastic material in liquid form, the bottom portion of said cavity having an upper surface shaped and figured like the desired face of the detergent bar to be pressed by said die; maintaining the temperature of the plastic above its melting point to keep it fluid; applying pressure to said plastic material in a liquid state to force it against the bottom and sides of said mold by lowering into said mold a piston member having removably attached thereto by attaching means a rigid member having a transverse cross-sectional area which is a substantial part of the corresponding mold cavity cross-sectional area, said attaching means being operably and removably connected to said rigid member and said piston; positioning said rigid member in said liquid plastic material substantially parallel to the bottom of said mold by said piston; cooling said plastic material while maintaining said pressure until said plastic material is solidified and lowered to a temperature below that at which it will shrink appreciably; releasing said die member having said rigid member embedded therein from said piston and said attaching means and removing said die member having a rigid member embedded therein from said mold.

References Cited by the Examiner

UNITED STATES PATENTS

| | | | |
|---|---|---|---|
| 1,734,727 | 11/1929 | Herold | 264—275 |
| 2,701,392 | 2/1955 | Eich | 264—275 |
| 2,918,703 | 12/1959 | Beal | 264—275 |
| 3,064,309 | 11/1962 | Steinbock et al. | 264—16 X |
| 3,074,112 | 1/1963 | Bobrow | 264—275 X |

ALEXANDER H. BRODMERKEL, *Primary Examiner.*

ROBERT F. WHITE, *Examiner.*

B. SYNDER, *Assistant Examiner.*